United States Patent
Blazer et al.

(10) Patent No.: US 10,078,191 B2
(45) Date of Patent: Sep. 18, 2018

(54) OPTICAL FIBER CABLE WITH INTERNAL PERIODIC COUPLING STRUCTURE

(71) Applicant: Corning Optical Communications LLC, Hickory, NC (US)

(72) Inventors: Bradley Jerome Blazer, Granite Falls, NC (US); Yangbin Chen, Lima, NY (US); Ching-Kee Chien, Horseheads, NY (US); Julian Latelle Greenwood, III, Hickory, NC (US); Jason Clay Lail, Conover, NC (US); Warren Welborn McAlpine, Hickory, NC (US); Christopher Mark Quinn, Hickory, NC (US); David Alan Seddon, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/334,761

(22) Filed: Oct. 26, 2016

(65) Prior Publication Data

US 2017/0139167 A1 May 18, 2017

Related U.S. Application Data

(60) Provisional application No. 62/256,785, filed on Nov. 18, 2015.

(51) Int. Cl.
*G02B 6/44* (2006.01)

(52) U.S. Cl.
CPC ......... *G02B 6/4405* (2013.01); *G02B 6/4403* (2013.01); *G02B 6/4433* (2013.01)

(58) Field of Classification Search
None
See application file for complete search history.

(56) References Cited

U.S. PATENT DOCUMENTS

| | | | |
|---|---|---|---|
| 5,163,116 A | 11/1992 | Oestreich et al. | |
| 6,178,278 B1 * | 1/2001 | Keller | G02B 6/4436 385/109 |
| 6,463,199 B1 | 10/2002 | Quinn et al. | |
| 6,847,768 B2 | 1/2005 | Lail et al. | |
| 6,970,629 B2 | 11/2005 | Lail et al. | |

(Continued)

FOREIGN PATENT DOCUMENTS

| | | | |
|---|---|---|---|
| DE | 2459997 B1 | 6/1976 | |
| DE | 2514996 B1 * | 9/1976 | ........... G02B 6/4405 |

(Continued)

OTHER PUBLICATIONS

International Search Report and Written Opinion PCT/US2016/057615 dated Jan. 19, 2017.

*Primary Examiner* — Mike Stahl
(74) *Attorney, Agent, or Firm* — William D. Doyle

(57) ABSTRACT

An optical cable is provided. The optical cable includes a tubular, elongate body having an inner surface defining a cavity extending between first and second ends of the elongate body and an optical transmission element located with the cavity. The optical cable includes a coupling or bonding structure non-permanently and non-rigidly joining the outer surface of the optical transmission element to the elongate body at a plurality of periodic contact zones such that relative movement between the optical transmission element and the elongate body is resisted.

18 Claims, 6 Drawing Sheets

(56) References Cited

U.S. PATENT DOCUMENTS

| | | |
|---|---|---|
| 7,397,992 B1 | 7/2008 | Blazer et al. |
| 8,346,040 B2 | 1/2013 | Testu et al. |
| 8,660,394 B2 | 2/2014 | Wells et al. |
| 8,682,123 B2 | 3/2014 | Parris |
| 8,891,923 B2 | 11/2014 | Parris |
| 2007/0047885 A1 | 3/2007 | Mayer et al. |
| 2009/0003781 A1 | 1/2009 | Parris et al. |

FOREIGN PATENT DOCUMENTS

| | | | |
|---|---|---|---|
| EP | 0022036 A1 | | 1/1981 |
| JP | 9-166733 A | * | 6/1997 |

* cited by examiner

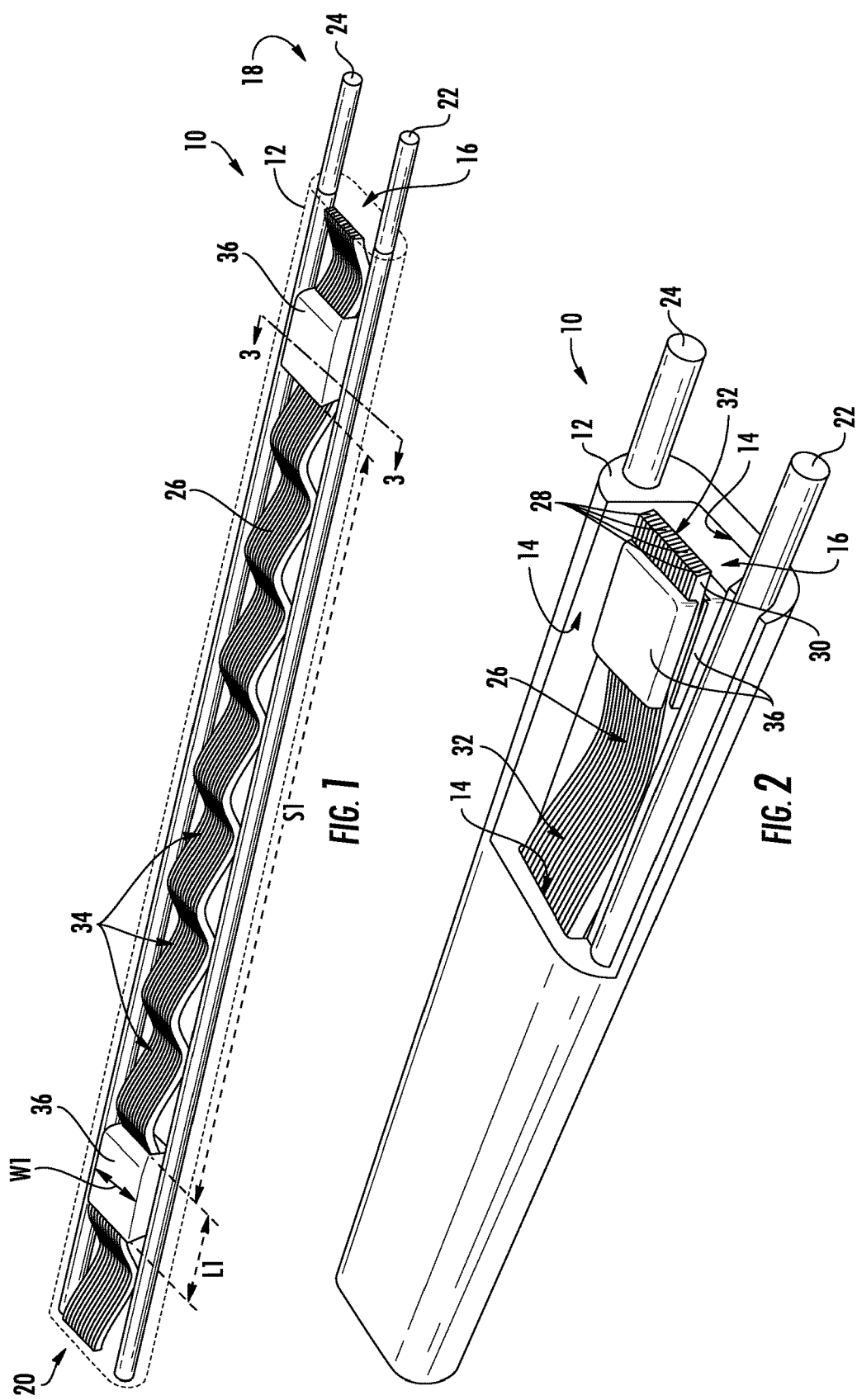

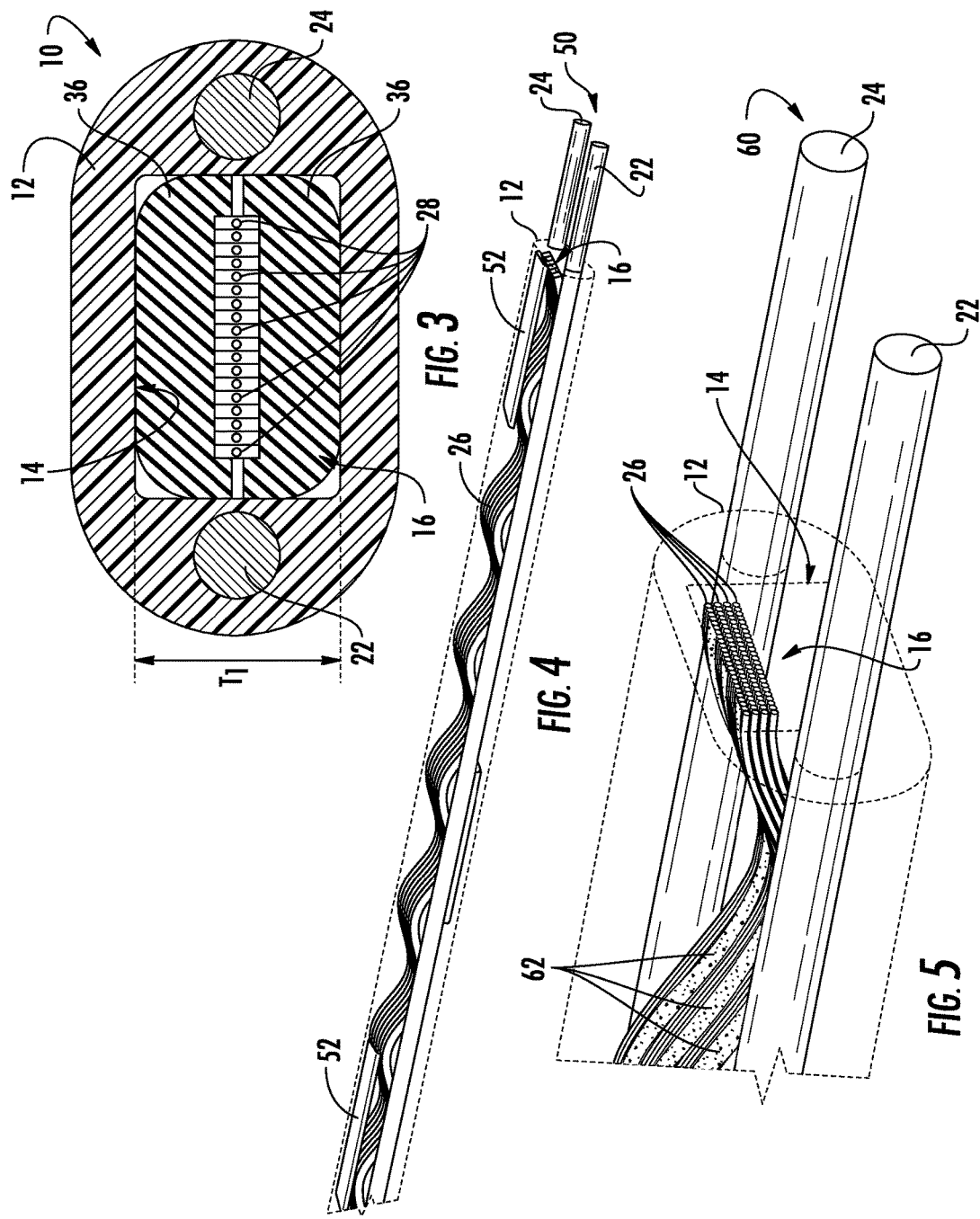

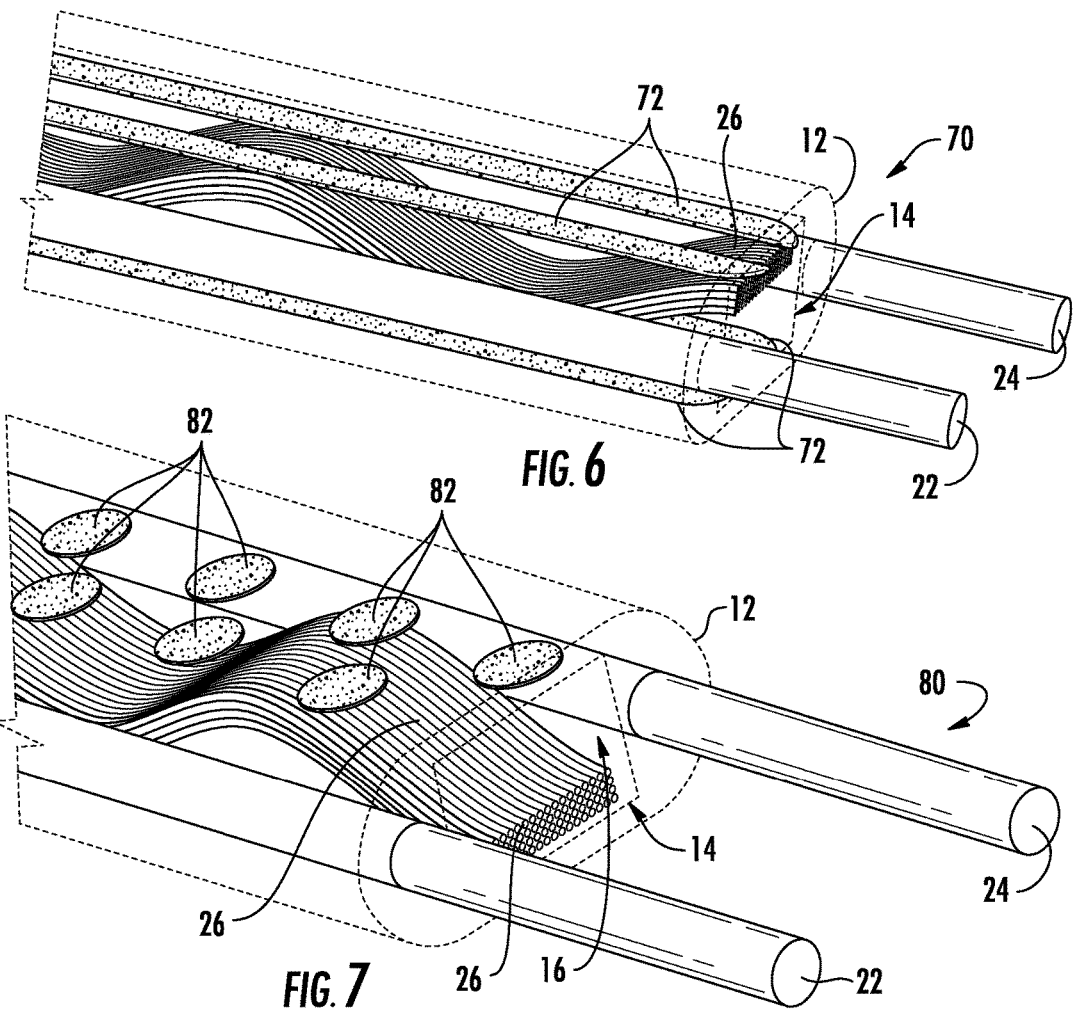
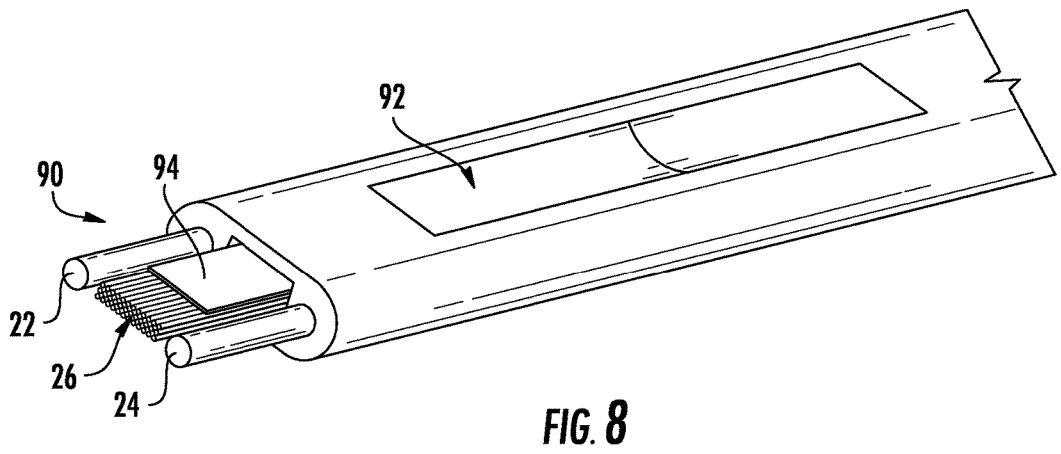

US 10,078,191 B2

OPTICAL FIBER CABLE WITH INTERNAL PERIODIC COUPLING STRUCTURE

CROSS-REFERENCE TO RELATED APPLICATIONS

This application claims the benefit of priority to U.S. Provisional Application No. 62/256,785, filed on Nov. 18, 2015, and is incorporated herein by reference.

BACKGROUND

The disclosure relates generally to cables and more particularly to fiber optic cables having an internal periodic coupling structure. Optical cables have seen increased use in a wide variety of fields including various electronics and telecommunications fields. Optical cables contain or surround one or more optical fibers. The cable provides structure and protection for the optical fibers within the cable.

SUMMARY

One embodiment of the disclosure relates to an optical cable. The optical cable includes a tubular, elongate body, having an inner surface defining a cavity extending between first and second ends of the elongate body, and an optical transmission element located within the cavity. The optical transmission element has an outer surface facing the inner surface of the elongate body and a length extending between the first and second ends of the elongate body. The cable includes a polymeric coupling structure contacting the outer surface of the optical transmission element and non-rigidly coupling the optical transmission element to the elongate body such that movement between the optical transmission element and the elongate body is resisted and not prevented. The coupling structure includes a plurality of spaced apart contact zones contacting the outer surface of the optical transmission element at a plurality of locations along the length of the optical transmission element and a plurality of spaces located between adjacent contact zones at which the outer surface of the optical transmission element is not contacted by the coupling structure or by the inner surface of the elongate body.

An additional embodiment of the disclosure relates to an optical cable. The optical cable includes a tubular, elongate body, having an inner surface defining a cavity extending between first and second ends of the elongate body, and an optical transmission element located within the cavity. The optical transmission element has an outer surface facing the inner surface of the elongate body and a length extending between the first and second ends of the elongate body. The cable includes a bonding structure non-permanently and non-rigidly joining the outer surface of the optical transmission element to the elongate body at a plurality of periodic contact zones such that relative movement between the optical transmission element and the elongate body is resisted. The bonding structure has a coefficient of coupling between the optical transmission element and the elongate body that is greater than 3 and less than 100.

An additional embodiment of the disclosure relates to an optical cable. The optical cable includes a cable jacket having an inner surface defining a cavity extending between first and second opposing ends of the cable jacket and an optical fiber ribbon located with the cavity. The optical fiber ribbon includes a polymeric ribbon body, having an outer surface facing the inner surface of the cable jacket and a length extending between the first and second ends of the cable jacket, and a plurality of optical fibers embedded in the ribbon body. The optical cable includes a bonding structure non-permanently and non-rigidly joining the outer surface of the optical fiber ribbon to the cable jacket at a plurality of discrete areas along the length of the cavity, such that relative movement between the optical fiber ribbon and the cavity is resisted. The bonding structure has a coefficient of coupling between the optical fiber ribbon and the cable jacket that is greater than 3.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 shows a perspective view of an optical fiber cable according to an exemplary embodiment.

FIG. 2 shows a detail cut-away view of the optical fiber cable of FIG. 1 according to an exemplary embodiment.

FIG. 3 shows a cross-sectional view of the optical fiber cable of FIG. 1 according to an exemplary embodiment.

FIG. 4 shows a perspective view of an optical fiber cable according to another exemplary embodiment.

FIG. 5 shows a perspective view of an optical fiber cable according to another exemplary embodiment.

FIG. 6 shows a perspective view of an optical fiber cable according to another exemplary embodiment.

FIG. 7 shows a perspective view of an optical fiber cable according to another exemplary embodiment.

FIG. 8 shows a perspective view of an optical fiber cable according to another exemplary embodiment.

DETAILED DESCRIPTION

Figure 9:
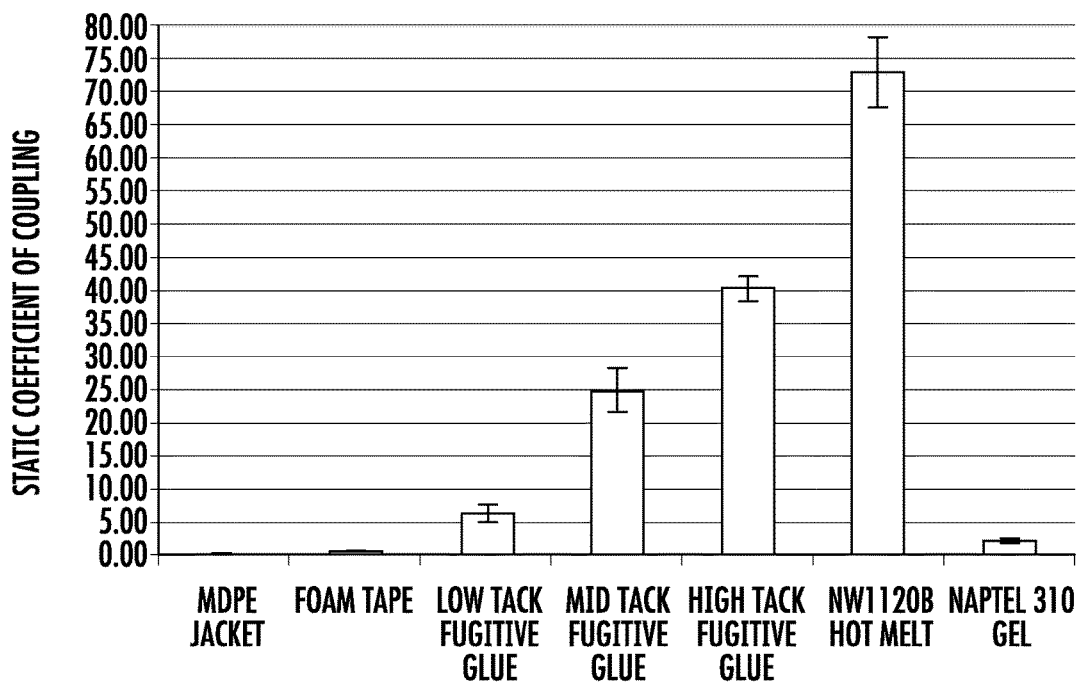
FIG. 9 shows a graph of the measured static coupling coefficient for various coupling structure materials according to an exemplary embodiment.

Referring generally to the figures, various embodiments of an optical cable including a coupling structure are shown and described. In general, the coupling or binding structures discussed herein provide non-rigid coupling (e.g., one that allows some relative movement) between an optical transmission element, such as an optical fiber ribbon, and an elongate, tubular body (e.g., a cable jacket, buffer tube, etc.). The coupling structures engage the outer surface of the optical transmission element at a plurality of positions along its length, such that frictional and/or adhesive forces between the coupling structure and the optical transmission element provides some degree of coupling while also allowing some relative movement of the optical transmission element and the surrounding hollow cable structure. Applicant has identified a number of coupling structure designs and/or material properties that provide a balance between providing a sufficiently high level of coupling that for example helps retain excess fiber/ribbon length within the tubular body, and providing a sufficiently low level of coupling that limits signal attenuation, for example under bending, loading, or thermal cycling.

Further, Applicant has identified that the coupling structures discussed herein provide various improvements relative to some cable designs that utilize nonwoven-backed, water blocking tape to provide coupling between an optical fiber and a surrounding hollow cable structure. For example, in some embodiments, the coupling structure discussed herein is an extrudable or hot melt polymer material that can be added to the cable assembly via an efficient process such as coextrusion, injection or application, rather than requiring the unspooling of and feeding of a contiguous water blocking tape.

Further, in various embodiments, Applicant has identified that the structures and materials of the present disclosure allow for the degree of coupling within the cable to be adjusted, set or controlled by controlling the coupling coefficient between the coupling structure and the optical transmission element. As will be understood, the level of coupling between a coupling structure and an optical transmission element is a function of various parameters including material type, size and shape of the coupling element, and in various embodiments, various coupling elements of various types can be selected to provide the desired level of coupling. In addition, in at least some embodiments, by eliminating the need for the addition of water blocking tape within the cavity, the cables discussed herein may include water blocking powders (e.g., SAP powders) applied directly to the cavity, for example during jacket or buffer tube extrusion. Further, by not utilizing contiguous strips of water blocking tape, the cables discussed herein do not have the processing constraints typically associated within tape insertion steps such as limited, finite tape length, in-line tape splicing, and in-line splicing errors.

Referring to FIGS. 1-3, an optical cable, cable 10, is shown according to an exemplary embodiment. Cable 10 includes a tubular, elongate body, shown as cable jacket 12 (shown in broken lines in FIG. 1) that includes an inner surface 14 that defines a cavity 16. As will be generally understood, cavity 16 extends the length of cable jacket 12 between first end 18 and second end 20 of cable jacket 12.

Cable 10 includes elongate strength members, such as rods 22 and 24, embedded within the material of cable jacket 12. As shown, rods 22 and 24 are positioned on opposite sides of cavity 16 and are substantially parallel to cavity 16. Rods 22 and 24 may be any suitable strength members, including glass reinforced plastic (GRP) rods and steel wires. In various embodiments, cable jacket 12 may be formed from a variety of materials used in cable manufacturing, including various extrudable polymer materials, polyethylene, polyvinyl chloride (PVC), polyvinylidene difluoride (PVDF), nylon, polypropylene, polyester or polycarbonate and their copolymers. In addition, the material of cable jacket 12 may include quantities of other materials or fillers that provide different properties to cable jacket 12. For example, the material of cable jacket 12 may include materials that provide for coloring, UV/light blocking (e.g., carbon black), fire resistance, etc.

Cable 10 includes an optical transmission element, shown as optical fiber ribbon 26, located within cavity 16 and extending the length of cavity 16 between ends 18 and 20. In general, optical fiber ribbon 26 may be any type of optical fiber ribbon and includes one or more optical fibers 28 embedded or surrounded in a polymer ribbon body 30. Polymer ribbon body 30 defines an outer surface 32 that faces inner surface 14 of cable jacket 12. In general, ribbon body 30 supports optical fibers 28 in an array that extends widthwise across cavity 16. In this arrangement, optical fibers 28 are substantially parallel to each other within cavity 16.

In various embodiments, optical fiber ribbon 26 has a wavy or generally sinusoidal arrangement within cavity 16. This non-linear arrangement allows for optical fiber ribbon 26 to have a length within cavity 16 that is greater than the length of cavity 16 and of cable jacket 12. This excess ribbon length ("EFL") allows for some degree of cable elongation before optical fibers 28 experience strain under loading thereby preventing/reducing strain-based signal attenuation within optical fibers 28. In various embodiments, the EFL is such that the length of ribbon 26 is between 0.05% and 1% and more specifically between 0.6% and 0.8% greater than the length of cable jacket 12 and/or of cavity 16, and in a specific embodiment, the EFL is such that the length of ribbon 26 is about 0.6% greater than the length of cable jacket 12 and/or cavity 16. Further, in this arrangement, the cross-sectional area of ribbon 26 is less than the cross-sectional area of cavity 16 such that cable 10 includes open areas, gaps or spaces 34 located within cavity 16 between ribbon 26 and inner surface 14 at various positions along the length of cable 10. At spaces 34, outer surfaces 32 of ribbon 26 do not contact and are spaced from inner surface 14 of cable jacket 12.

Cable 10 includes a coupling or bonding structure, shown as a plurality of coupling plugs 36, located within cavity 16. In general, coupling plugs 36 are plugs or blocks of an elastomeric polymer material that engage or contact outer surface 32 of ribbon 26 defining a plurality of contact zones at the location of each plug. In addition, coupling plugs 36 are also coupled to inner surface 14 of cable jacket 12. In general, coupling plugs 36 are non-rigidly coupled to ribbon 26 via contact between opposing surfaces such that some level of movement is permitted between ribbon 26 and coupling plugs 36 and/or cable jacket 12. In various embodiments, the coupling or bonding between coupling plugs 36 and ribbon 26 is provided by friction, adhesion or a combination of friction and adhesion within the contact zone between ribbon 26 and plugs 36. In some such embodiments, because cable 10 utilizes coupling plugs 36 and may include embedded or blown-in SAP particles, cable 10 does not include a water blocking tape, such as a nonwoven backed SAP bearing tape, located with cavity 16.

In various embodiments, as shown in FIG. 3, coupling plugs 36 surround ribbon 26, and fill cavity 16 at the location of the plug. In various embodiments, coupling plugs 36 provide water-tight sealing with ribbon 26 and with inner surface 14 such that the need to include water blocking materials within cavity 16 is reduced or eliminated.

In various embodiments, coupling plugs 36 are rigidly coupled to cable jacket 12 such that relative movement between coupling plugs 36 and cable jacket 12 is not permitted. In this arrangement, coupling plugs 36 act to mechanically couple ribbon 26 to strength rods 22 and 24. Further, because coupling plugs 36 are fixed, bonded or coupled to cable jacket 12 but are not rigidly or permanently coupled to ribbon 26, coupling plugs 36 stay connected to cable jacket 12 upon opening of cable jacket 12, e.g., during an operation to access ribbon 26. In various embodiments, the relatively low level of bonding between coupling plugs 36 and ribbon 26 facilitates ribbon access and splicing by not requiring substantial cleaning to remove plug material from the ribbon before further steps can be performed.

In various embodiments, coupling plugs 36 are formed from a polymer material that is different from the polymer material of cable jacket 12 and/or is different from the polymer material of ribbon body 30. In various embodiments, cable jacket 12 is formed from an extrudable thermoplastic material such as a medium density polyethylene or polypropylene, ribbon body 30 may be formed from a UV curable polymer material, and coupling plugs 36 may be formed from an extrudable polymer material, an elastomeric material and/or from a hot melt thermoplastic adhesive. In some such embodiments, the material of coupling plugs 36 is selected to provide a relatively high level of bonding with the material of cable jacket 12 while providing a relatively low level of bonding to the material of ribbon body 30.

In various embodiments, coupling plugs 36 are formed from materials and/or are structured to provide a greater level of coupling with ribbon 26 when compared to the level of coupling between a ribbon and a water-blocking tape material or between a ribbon and the inner surface of the cable jacket. In various embodiments, coupling plugs 36 have a coefficient of coupling with ribbon 26 that is greater than 3. In a specific embodiment, coupling plugs 36 have a coefficient of coupling with ribbon 26 that is greater than 3 and less than 100. In various embodiments, the fiber/ribbon coupling rate may be evaluated with several different methods, including a field-like ribbon coupling test to measure relative ribbon movement and attenuation, an indoor coupling procedure that incorporates the use of a BOTDR gauge to measure fiber strain, and a lab environment ribbon pullout test that measures the effective coupling rate in a cable. In particular embodiments, the coupling coefficients described herein were determined using the RPT test protocol associated with the Verizon FOC program, and/or the GR-20 and GR-409 Final Test Plans for UL.

In addition, coupling plugs 36 are formed from a single material or mixture of two or more materials that have a relatively high level of elasticity and a relatively low glass transition temperature (Tg). Applicant believes that utilizing such materials provides cable 10 with the desired level of coupling, while at the same time reducing the amount of strain experienced by fibers 28 of ribbon 26 during bending, loading or thermal cycling. In various embodiments, the polymer material of coupling plugs 36 is formed from a material that has a modulus of elasticity that is less than 2000 MPa within a temperature range −40 degrees C. and 70 degrees C. Further, in various embodiments, the polymer material of coupling plugs 36 is formed from a material with a glass transition temperature (Tg) that is less than 50 degrees C. In various embodiments, coupling plugs 36 may be formed from various materials including low tack fugitive glue (e.g., 612LT available from On-Hand Adhesives), mid-tack fugitive glue (e.g., 612MT available from On-Hand Adhesives), high tack fugitive glue (e.g., 612HT available from On-Hand Adhesives), and in specific embodiments, it may be formed from NW1120B available from H. B. Fuller, Naptel 310 gel available from Soltex, NW1117 available from H. B. Fuller, Ad-Tech 189 available from Adhesive Technologies, HM-8532 available from Warren Adhesives, TECHNOMELT PS 8845 available from Henkel), Technomelt Q 4206 available from Henkel, HM008B available from Stewart Superabsorbents and HM002 available from Stewart Superabsorbents. In at least some embodiments, the material of coupling plugs 36 include SAP particles.

In various embodiments, coupling plugs 36 may be formed from a variety of elastomeric adhesives, glues or sealants and may be either thermoplastic or thermoset in nature. In various embodiments, the coupling structures discussed herein may be multi-layer structures. In such embodiments, each layer may be formed with a different material or different combination of materials to provide different physical properties at each layer within the coupling structure.

In various embodiments, the material of coupling plugs 36 may include foaming additives, compatibility agents and plasticizers. In some embodiments, coupling plugs 36 may include a thermal barrier, such as a heat resistant film, that may be utilized to help maintain the desired shape of plugs 36 during injection of the material. In various embodiments, coupling plugs 36 may be surface cross-linked to maintain shape. In various embodiments, coupling plugs 36 may include a thickening agent, such as superfine fumed silica or superfine SAP powder, to help maintain shape and form during material injection.

In addition to material type, coupling plugs 36 are also sized and positioned to provide a suitable level of coupling. In various embodiments, coupling plugs 36 have a width, W1, a length, L1 and thickness, T1. In various embodiments, L1 is between 5 mm and 50 mm and specifically is about 10 mm. In one embodiment, L1 is less than 50 mm in order to provide cable 10 with satisfactory bend performance.

T1 is selected such that coupling plug 36 fills or plugs cavity 16 at the location of the plug. In various embodiments, each coupling plug 36 is sized to provide a contact area with ribbon 26 that provides the desired level of coupling.

In additional, cable 10 includes multiple plugs 36 along its length to provide the desired level of coupling. In various embodiments, a longitudinal separation distance, S1, is located between adjacent coupling plugs 36, and in various embodiments, S1 is between 0.25 m and 10 m and specifically is between 0.5 m and 3 m. In some embodiments, coupling plugs 36 are evenly spaced along the length of cable 10, and in other embodiments, S1 varies at different positions along the length of cable 10. As will be understood, the dimensions of plugs 36 and the spacing distance S1 may be set in conjunction with different material properties to achieve the desired overall coupling. In specific embodiments, L1 is about 10 mm and S1 is about 1 m, and in another embodiment, L1 is about 10 mm and S1 is about 2 m.

In various embodiments, coupling plugs 36 are designed to provide various levels of coupling as desired for particular applications. In one embodiment, coupling plugs 36 are configured to provide relatively weak coupling, such as between 0.05 and 0.16 N/m/fiber. In another embodiment, coupling plugs 36 are configured to provide moderate coupling, such as between 0.16 and 0.33 N/m/fiber. In another embodiment, coupling plugs 36 are configured to provide relatively strong coupling, such as between 0.33 and 0.50 N/m/fiber.

It should be understood that the coupling or bonding structures discussed herein may be used to provide coupling between any tubular, elongate cable structure and are not limited to coupling within a cable jacket. For example, the coupling or bonding structures discussed herein may be used to couple an optical fiber ribbon or other optical transmission element within a buffer tube. Further, in various embodiments, the coupling or joining between the optical fiber elements and the surrounding hollow structure may be indirect with various intervening layers located between the coupling structure and either the optical transmission element or the tubular elongate body. For example, cable 10 may include armor layers, strength yarn fibers, binder layers, etc. located either between ribbon 26 and coupling plugs 36 and/or between coupling plugs 36 and inner surface 14 of jacket 12.

Referring to FIG. 4, another optical cable, shown as cable 50, is shown according to an exemplary embodiment. Cable 50 is substantially similar to cable 10 except as discussed herein. Cable 50 includes a coupling or bonding structure, shown as a plurality of adhesive patches 52, located within cavity 16, applied between ribbon 26 and inner surface 14 of cable jacket 12. In this embodiment, adhesive patches 52 are formed from a tacky hot melt material applied in periodic sections along inner surface 14 of jacket 12. In a particular embodiment, adhesive patches 52 extend the whole width of cavity 16. In this arrangement, as cable 50 bends, twists, etc., various portions of ribbon 26 engage and are non-permanently coupled to adhesive patches 52. Further, in one embodiment, in contrast to coupling plugs 36, adhesive patches 52 do not fill the entire height of cavity 16 around ribbon 26, and thus in some embodiments, cable 50 includes water blocking powders or components in cavity 16. In a specific embodiment, the longitudinal length of patches 52 is longer (e.g., 10% longer) than the peak to peak distance of the wavy pattern of ribbon 26 such that each patch 52 is permitted to contact at least one peak of ribbon 26.

Referring to FIG. 5, another optical cable, shown as cable 60, is shown according to an exemplary embodiment. Cable 60 is substantially similar to cable 10 except as discussed herein. Cable 60 includes a coupling or bonding structure, shown as a plurality of adhesive stripes 62, located within cavity 16, applied between ribbon 26 and inner surface 14 of cable jacket 12. In this embodiment, adhesive stripes 62 are formed from a tacky hot melt material applied in contiguous lengthwise strips along the outer surfaces of ribbons 26. In addition, cable 60 includes multiple ribbons 26 in a ribbon stack within cavity 16. As shown, cable 60 includes multiple lengthwise stripes 62. Similar to adhesive patches 52, as cable 60 bends, twists, etc. adhesive stripe 62 engages and non-permanently couples to inner surface 14 of jacket 12. In this embodiment, periodic coupling is provided by the wavy or sinusoidal arrangement of ribbons 26 within cavity 16 causing adhesive stripes 62 to periodically contact inner surface 14 of cable jacket 12.

Referring to FIG. 6, another optical cable, shown as cable 70, is shown according to an exemplary embodiment. Cable 70 is substantially similar to cable 10 except as discussed herein. Cable 70 includes a coupling or bonding structure, shown as a plurality of adhesive stripes 72, located within cavity 16, applied between ribbon 26 and inner surface 14 of cable jacket 12. In this embodiment, adhesive stripes 72 are formed from a tacky hot melt material applied in contiguous lengthwise strips along inner surface 14 of cable jacket 12.

As shown, cable 70 includes multiple lengthwise stripes 72 located on both the upper portion of inner surface 14 and on a lower portion of inner surface 14 such that lengthwise stripes 72 engage and non-permanently couple to both the upper and lower outer surfaces of ribbons 26. Similar to adhesive patches 52, as cable 70 bends, twists, etc. adhesive stripes 72 engage and non-permanently couple to the outer surface of ribbons 26. In this embodiment, periodic coupling is provided by the wavy or sinusoidal arrangement of ribbons 26 within cavity 16 causing the outer surface of ribbon 26 to periodically contact adhesive stripes 72.

Referring to FIG. 7, another optical cable, shown as cable 80, is shown according to an exemplary embodiment. Cable 80 is substantially similar to cable 10 except as discussed herein. Cable 80 includes a coupling or bonding structure, shown as a plurality of adhesive patches 82, located within cavity 16, applied between ribbon 26 and inner surface 14 of cable jacket 12. In this embodiment, adhesive patches 82 are formed from a tacky hot melt material applied in a plurality of discrete patches or dots along inner surface 14 of cable jacket 12. Cable 80 includes multiple patches 82 located on both the upper portion of inner surface 14 and on a lower portion of inner surface 14, such that patches 82 engage and non-permanently couple to both the upper and lower outer surfaces of ribbons 26. Similar to adhesive patches 52, as cable 80 bends, twists, etc. adhesive patches 82 engage and non-permanently couple to inner surface 14 of jacket 12. In this embodiment, periodic coupling is provided by the wavy or sinusoidal arrangement of ribbons 26 within cavity 16 and by the periodic arrangement of patches 82 causing the outer surface of ribbon 26 to periodically contact adhesive patches 82. In this embodiment, adhesive patches 82 increase the number of discrete coupling sites while limiting the maximum size of any one coupling site to the area of patches 82.

Referring to FIG. 8, another optical cable, shown as cable 90, is shown according to an exemplary embodiment. Cable 90 is substantially similar to cable 10 except as discussed herein. Cable 90 includes a coupling or bonding structure, shown as crimped jacket wall section 92. Cable 90 may include a plurality of discrete crimped jacket wall sections 92 spaced along the length of cable 90. In general, crimped jacket wall sections 92 result in a decreased cross-sectional area of cavity 16 which in turn increases the amount of contact between the outer surface of ribbons 26 and inner surface 14 at the location of crimped jacket wall section 92, and thereby increases the frictional coupling between ribbons 26 and jacket 12. As can be seen in FIG. 8, cable 90 may also include water blocking tape 94 located between ribbons 26 and jacket 12 such that the coupling provided by crimped jacket wall sections 92 and ribbons 26 occurs through water blocking tape 94 as an intervening layer.

In various embodiments, any of the coupling elements discussed herein may be located only on one ribbon 26 within the ribbon stack. In another embodiment, coupling elements may be located on both upper and lower ribbons 26 in the ribbon stack, and in some such embodiments, different types or patterns of coupling elements may be utilized to couple the top and bottom ribbons, respectively. For example, in one embodiment, a cable may include adhesive strips 72 coupling to a top ribbon 26 in the ribbon stack and adhesive patches 82 coupling to a bottom ribbon 26 in the ribbon stack.

Figure 10:
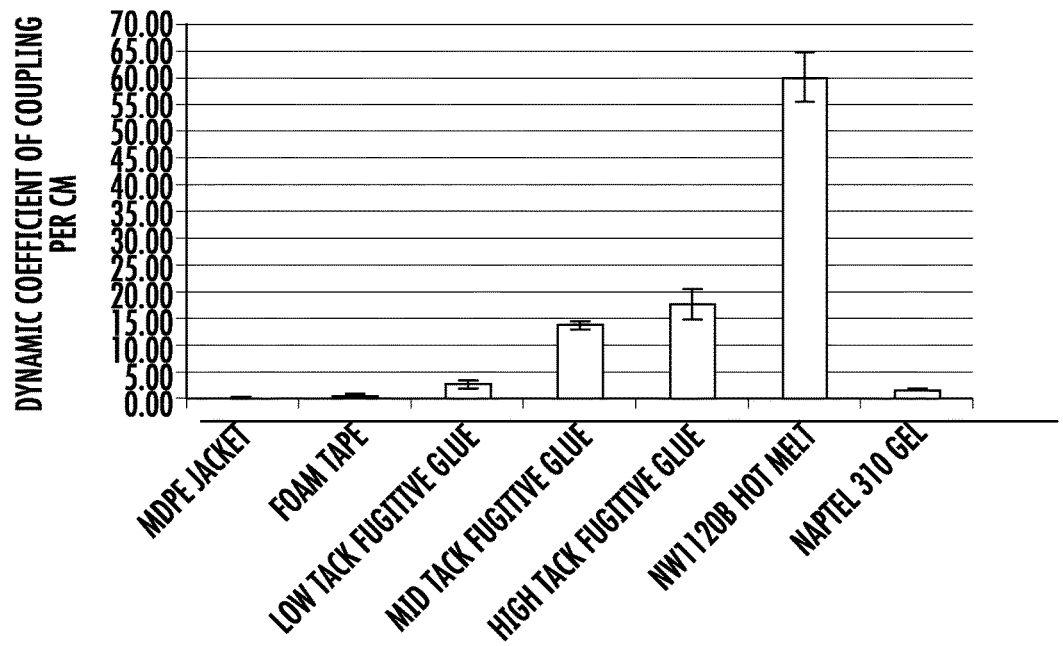
FIG. 10 shows a graph of the measured dynamic coupling coefficient for various coupling structure materials according to an exemplary embodiment.
Figure 11:
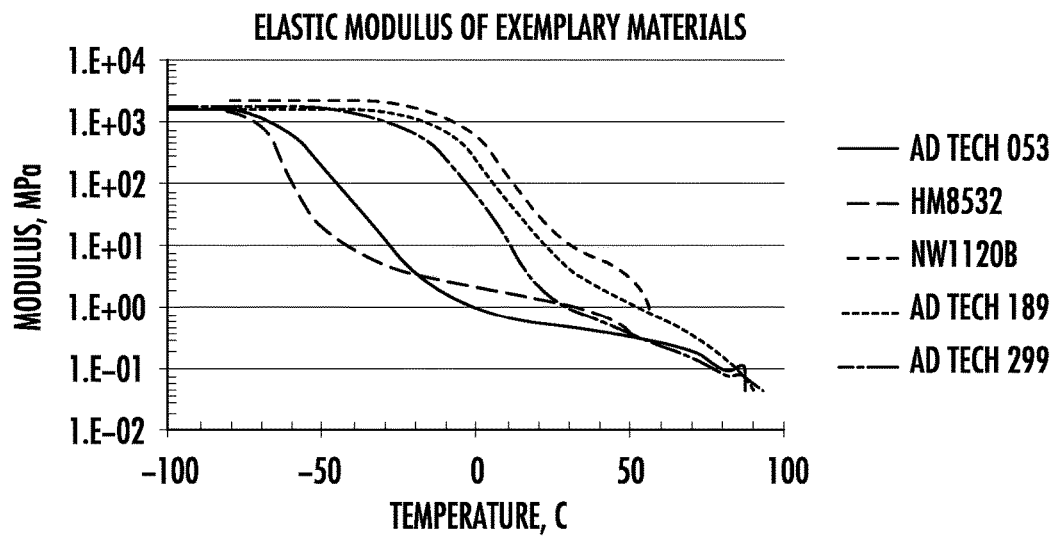
FIG. 11 shows a graph of the elastic modulus for various coupling structure materials according to an exemplary embodiment.
Figure 12:
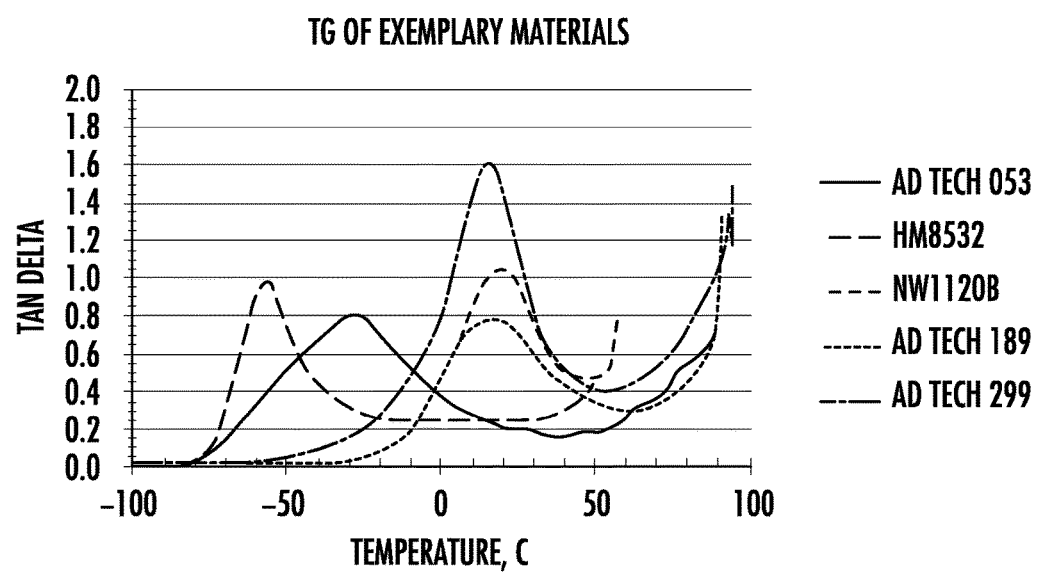
FIG. 12 shows a graph of the glass transition temperature for various coupling structure materials according to an exemplary embodiment.

As noted above, the coupling or bonding structures discussed herein may be formed of different materials influencing the degree of coupling provided by the coupling structure. Referring to FIGS. 9-12 various physical properties of various coupling materials/structures are shown. In addition, FIGS. 9 and 10 compare the degree of coupling of the various coupling materials to the level of coupling achieved between an optical fiber ribbon and medium density polyethylene (MDPE) jacket (first bar) and between an optical fiber ribbon and a foam water blocking tape (second bar). As shown in FIGS. 9 and 10, the coupling structures discussed herein provide between about 10× and 200× coupling as compared to an MDPE jacket and a foam water blocking tape. Further, FIG. 11 shows the modulus elasticity for five exemplary coupling structure materials with the temperature range of −100 degrees C. to 100 degrees C. FIG. 12 shows tan delta of the five materials plotted against temperature with the temperature range of −100 degrees C. to 100 degrees C., and the glass transition temperature of each material (Tg) is generally located at the peak of the plot shown in FIG. 12. The materials shown in FIGS. 11 and 12 were characterized by Dynamic Mechanical Analyzer (DMA).

Figure 13:
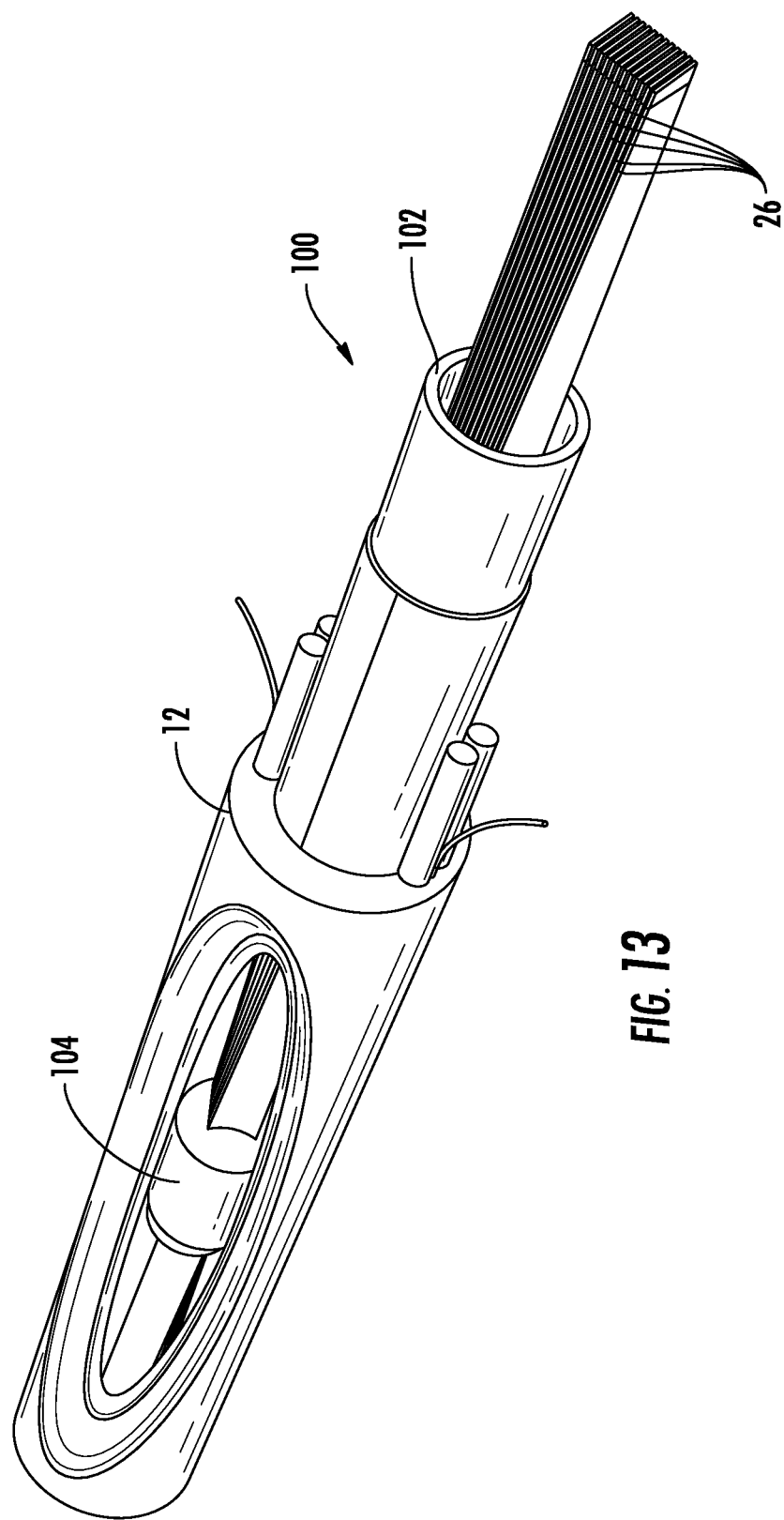
FIG. 13 shows a perspective view of an optical fiber cable including a coupling element located within a buffer tube according to another exemplary embodiment.

Referring to FIG. 13, an optical cable 100 is shown. In general, optical cable 100 includes a tubular, elongate body, shown as buffer tube 102, and ribbons 26 are located within buffer tube 102. As shown in FIG. 13, cable 100 includes a polymeric coupling structure, shown as coupling plug 104, coupling ribbons 26 to the inner surface of buffer tube 102 as discussed above. The coupling structure of cable 100 may be any of the coupling structures discussed herein and may be located along the inner surface of buffer tube 102 and/or along the outer surfaces of one or more ribbon 26.

In general, the cable embodiments discussed herein can be formed in a wide variety of suitable ways. In at least some embodiments, cable jacket 12 is formed from an extrudable polymer material that is extruded around ribbons 26 and strength members 22 and 24. In various embodiments, the material of the coupling components may be injected or coextruded along with the material forming jacket 12. In some embodiments (e.g., cable 60), the material of the coupling structure may be applied directly to ribbon 26 prior to entering the jacket extruder.

In various embodiments, SAP particles are blown or otherwise deposited into the extrusion assembly such that SAP particles embed in inner surface 14 of cable jacket 12 and/or into the material of the various coupling elements discussed herein. In specific embodiments in which the tubular body is a buffer tube, the SAP powder is metered and injected at 33-42 mg/sec with buffer tube extrusion line speeds from 200-300 m/min. Similar rates of 2×-4× more powder can be injected into a cable jacket cavity (such as cavity 16) or large ribbon buffer tube in order to provide water-blocking within cavities in larger ribbon buffer tubes or central cavity cables. In various embodiments, the SAP particles may be injected either periodically or continuously during cable formation.

In various embodiments, the coupling structure material may be co-extruded with the polymer material forming a hollow cable structure (e.g., cable jacket, buffer tube, etc.) using a co-extruder or glue pump to inject the material directly into the polymer flow within the extrusion head. In other embodiments, the coupling structure material may also be applied to the optical fiber elements (e.g., the optical fiber ribbon) prior to the extrusion head or piped through the extrusion head and applied at or near the exit of the extrusion head. A valve controlled by the machine may be used to start and stop the flow of the coupling structure material for intermittent application.

In an exemplary embodiment, the cable embodiments discussed herein are produced using a stretch-release process to form a cable having excess cable length. In such a process, the strength elements (e.g., rods 22 and 24) are pre-strained to, for example, 0.80% stretched length increase. Ribbons 26 are inserted unstretched (e.g., 0.00% length increase) as jacket 12 is extruded. As the finished cable is taken up on the cable reel following jacket extrusion, the strain on the strength elements is released. The extruded jacket 12 and the embedded strength elements relax to 0.00% strain and the relative ribbon length increases. In various embodiments, the various coupling structures discussed herein provide a coupling force on to ribbon 26 such that an extra 0.05%-1%, specifically 0.60-0.80%, of extra ribbon length is held or maintained within the cable.

In various embodiments, the ribbon bodies discussed herein may be formed by applying a polymer material, such as a UV curable polymer material, around optical fibers 28 in the desired arrangement to form a particular ribbon body. The polymer material is then cured forming the integral, contiguous ribbon body while also coupling the ribbon body to the optical fibers. In other embodiments, the ribbon bodies discussed herein may be formed from any suitable polymer material, including thermoplastic materials and thermoset materials.

It should be understood that the optical ribbons discussed herein can include various numbers of optical fibers 28. In various exemplary embodiments, the optical ribbons discussed herein may include 2, 4, 6, 8, 10, 12, 14, 16, 24 etc. optical fibers or transmission elements (e.g., optical fibers 28). While the ribbon embodiments discussed herein are shown having optical fibers 28 arranged in a substantially parallel, linear array, optical fibers 28 may be arranged in a square array, rectangular array, a staggered array, or any other spatial pattern that may be desirable for a particular application.

In various embodiments, optical fibers 28 can include a wide variety of optical fibers including multi-mode fibers, single mode fibers, bend insensitive/resistant fibers, etc. In other embodiments, the optical ribbons discussed herein may include a multi-core optical fiber located within ribbon body 30. In this embodiment, a single, integral optical structure having multiple optical transmission elements (e.g., multiple optical cores surrounded by cladding) may be provided, and the single multi-core optical fiber is embedded in one of the stress-isolating ribbon matrix embodiments and/or coated with a coating layer. In specific exemplary embodiments, optical fibers 28 may be any suitable optical fiber, including Corning's Ultra® SMF-28, ClearCurve® LBL and ZBL G.652 compatible optical fibers.

Further, it should be understood that while the coupling elements discussed herein are primarily described as coupling ribbons, the coupling elements may be used to couple to a wide variety of optical transmission elements. For example in some embodiments, the coupling elements are used to couple loose optical fibers, e.g., loose buffer optical fibers. In some embodiments, the optical transmission elements include optical fibers colored at the 200-260 micron range and tight buffered optical fibers buffered at the 500-900 micron range. In various embodiments, the tight buffering may be PVC, PE, flame retardant PE, etc.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical transmission elements discussed herein can include a wide variety of optical fibers including multi-mode fibers, single mode fibers, bend insensitive/resistant fibers, etc. In other embodiments, the optical cables discussed herein may include multi-core optical fibers, and in this embodiment, each optical transmission element may be a single, integral optical structure having multiple optical transmission elements (e.g., multiple optical cores surrounded by cladding).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical cable comprising:
    a tubular, elongate body having an inner surface defining a cavity extending between first and second ends of the elongate body;
    an optical transmission element located within the cavity, the optical transmission element having an outer surface facing the inner surface of the elongate body and a length extending between the first and second ends of the elongate body; and
    a polymeric coupling structure contacting the outer surface of the optical transmission element and non-rigidly coupling the optical transmission element to the elongate body such that movement between the optical transmission element and the elongate body is resisted and not prevented, wherein the coupling structure includes a plurality of spaced apart contact zones contacting the outer surface of the optical transmission element at a plurality of locations along the length of the optical transmission element and a plurality of spaces located between adjacent contact zones at which the outer surface of the optical transmission element is not contacted by the coupling structure or by the inner surface of the elongate body
    wherein the elongate body is formed from a first polymer material and the polymeric coupling structure is formed from a second polymer material that is different from the first polymer material;
    wherein the second polymer material has a modulus of elasticity that is less than 1000 MPa within a temperature range −40 degrees C. and 70 degrees C., and a glass transition temperature (Tg) that is less than 50 degrees C.

2. The optical cable of claim 1, wherein the optical transmission element is an optical fiber ribbon including a plurality of optical fibers supported by a polymeric ribbon body.

3. The optical cable of claim 2, wherein the elongate body is a polymeric cable jacket having an outer surface defining an outer surface of the optical cable, and further comprising at least two elongate strength elements, wherein the cavity is located between the at least two elongate strength elements, wherein the cross-sectional area of the cavity is greater than the cross-section area of the optical fiber ribbon such that a plurality of gaps between the optical fiber ribbon and inner surface of the cable jacket are located along the length of the cavity, wherein the length of the optical fiber ribbon is between 0.05% and 1% greater than a length of the cable jacket.

4. The optical cable of claim 1 wherein the second polymer material is a thermoplastic adhesive material located along the inner surface of the elongate body, wherein the plurality of contact zones are portions of the thermoplastic adhesive material contacting portions of an outer surface of the ribbon body.

5. The optical cable of claim 4, wherein the thermoplastic adhesive is integrally and permanently coupled to the elongate body.

6. The optical cable of claim 1, wherein a coefficient of static coupling between the polymeric coupling structure and the optical transmission element is greater than 3.

7. The optical cable of claim 1, further comprising an outer cable jacket surrounding the elongate body, wherein the elongate body is a polymeric buffer tube.

8. The optical cable of claim 1, wherein the coupling structure is at least one of: a plurality of polymeric plugs periodically spaced within the cavity and contacting portions of the inner surface on opposite sides of the cavity; a plurality of adhesive strips periodically spaced within the cavity, a continuous strip of adhesive material located on the outer surface of the optical transmission element and extending along the entire length of the transmission element, a continuous strip of adhesive material located on the inner surface of the elongate body, a plurality of periodic adhesive patches located on the inner surface of the elongate body, and a plurality of periodic regions of decreased inner diameter of the elongate body forming periodic contact zones between the inner surface of the elongate body and the outer surface of the elongate optical transmission element.

9. An optical cable comprising:
    a tubular, elongate body having an inner surface defining a cavity extending between first and second ends of the elongate body;
    an optical transmission element located within the cavity, the optical transmission element having an outer surface facing the inner surface of the elongate body and a length extending between the first and second ends of the elongate body; and
    a bonding structure non-permanently and non-rigidly joining the outer surface of the optical transmission element to the elongate body at a plurality of periodic contact zones such that relative movement between the optical transmission element and the elongate body is resisted;
    wherein the bonding structure has a coefficient of coupling between the optical transmission element and the elongate body that is greater than 3 and less than 100.

10. The optical cable of claim 9, wherein the optical transmission element is an optical fiber ribbon including a plurality of optical fibers supported by a polymeric ribbon body, wherein the cross-sectional area of the cavity is greater than the cross-sectional area of the optical fiber ribbon such that a plurality of gaps exist between the outer surface of the optical fiber ribbon and inner surface of the elongate body at multiple locations along the length of the elongate body, wherein the length of the optical fiber ribbon is greater than a length of the elongate body.

11. The optical cable of claim 10, wherein the elongate body is formed from a first polymer material and the bonding structure is formed from a second polymer material that is different from the first polymer material.

12. The optical cable of claim 11, wherein the second polymer material is a thermoplastic material located within the cavity, wherein the plurality of contact zones are portions of the thermoplastic material contacting portions of an outer surface of the polymeric ribbon body.

13. The optical cable of claim 11, wherein the second polymer material has a modulus of elasticity that is less than 1000 MPa within a temperature range −40 degrees C. and 70 degrees C., and a glass transition temperature (Tg) that is less than 50 degrees C.

14. The optical cable of claim 9, wherein the bonding structure is rigidly and permanently coupled to the elongate body, such that the bonding structure remains coupled to the elongate body upon separation of the elongate body from the optical transmission element.

15. The optical cable of claim 9, wherein the elongate body is a polymeric cable jacket having an outer surface defining an outer surface of the optical cable, and further comprising elongate strength elements embedded within the cable jacket.

16. An optical cable comprising:
a cable jacket having an inner surface defining a cavity extending between first and second opposing ends of the cable jacket;
an optical fiber ribbon located within the cavity, the optical fiber ribbon comprising:
a polymeric ribbon body having an outer surface facing the inner surface of the cable jacket and a length extending between the first and second ends of the cable jacket; and
a plurality of optical fibers embedded in the ribbon body; and
a bonding structure non-permanently and non-rigidly joining the outer surface of the optical fiber ribbon to the cable jacket at a plurality of discrete areas along the length of the cavity such that relative movement between the optical fiber ribbon and the cavity is resisted;
wherein the bonding structure has a coefficient of coupling between the optical fiber ribbon and the cable jacket that is greater than 3.

17. The optical cable of claim 16, wherein the cable jacket is formed from a first polymer material, the ribbon body is formed from a second polymer material and the bonding structure is formed from a third polymer material that is different from the first polymer material and from the second polymer material, wherein the cross-sectional area of the cavity is greater than the cross-sectional area of the optical fiber ribbon such that a plurality of gaps exist between the outer surface of the ribbon body and the inner surface of the cable jacket at multiple points along the length of the cavity, wherein the length of the optical fiber ribbon is greater than the length of the cavity.

18. The optical cable of claim 17, wherein the third polymer material has a modulus of elasticity that is less than 1000 MPa within a temperature range −40 degrees C. and 70 degrees C., and a glass transition temperature (Tg) that is less than 50 degrees C.

* * * * *